United States Patent
Shields

(10) Patent No.: US 9,869,406 B1
(45) Date of Patent: Jan. 16, 2018

(54) SECURING TOOL

(71) Applicant: Robert Carl Shields, Louisville, KY (US)

(72) Inventor: Robert Carl Shields, Louisville, KY (US)

( * ) Notice: Subject to any disclaimer, the term of this patent is extended or adjusted under 35 U.S.C. 154(b) by 168 days.

(21) Appl. No.: 14/835,052

(22) Filed: Aug. 25, 2015

(51) Int. Cl.
*F16L 3/13* (2006.01)
*G01D 11/30* (2006.01)

(52) U.S. Cl.
CPC ............... *F16L 3/13* (2013.01); *G01D 11/30* (2013.01)

(58) Field of Classification Search
CPC .................................. F16L 3/13; G01D 11/30
See application file for complete search history.

(56) References Cited

U.S. PATENT DOCUMENTS

| | | | |
|---|---|---|---|
| 625,492 | A | 5/1899 | Laney |
| 761,151 | A | 5/1904 | Cummings |
| 1,860,284 | A | 5/1932 | Gunn |
| 2,835,028 | A | 5/1958 | Wurzel |
| 5,647,407 | A | 7/1997 | Scott et al. |
| 6,907,802 | B2 | 6/2005 | Schneider |
| 6,952,982 | B2 | 10/2005 | Williford et al. |
| 6,981,432 | B2 | 1/2006 | Williford et al. |
| 7,165,476 | B2 | 1/2007 | Panyard et al. |
| 7,225,706 | B2 | 6/2007 | Kassabian |
| 2005/0044992 | A1* | 3/2005 | Williford ............. B25B 25/005 81/9.3 |
| 2005/0262969 | A1* | 12/2005 | Panyard ............... B25B 25/005 81/9.3 |

OTHER PUBLICATIONS

WayBack Machine Advanced Force Measurement Capture, Sep. 2014.*

* cited by examiner

*Primary Examiner* — Peter Macchiarolo
*Assistant Examiner* — Timothy Graves
(74) *Attorney, Agent, or Firm* — Middleton Reutlinger

(57) ABSTRACT

A securing tool and methods for its use are described herein. In various embodiments, the securing tool may include a handle and a prying member positioned at a first end of the securing tool opposite the handle. The prying member may be shaped to engage a release of a self-tensioned hose clamp to cause the handle to be manipulable to spring the self-tensioned hose clamp. The securing tool may include first and second sensors configured to provide first and second signals, respectively, that are indicative of sensed occurrence of first and second events after the handle is manipulated to spring the self-tensioned hose clamp. In various embodiments, if the first and second signals satisfy a criterion, the hose clamp may be deemed to have been properly installed.

17 Claims, 5 Drawing Sheets

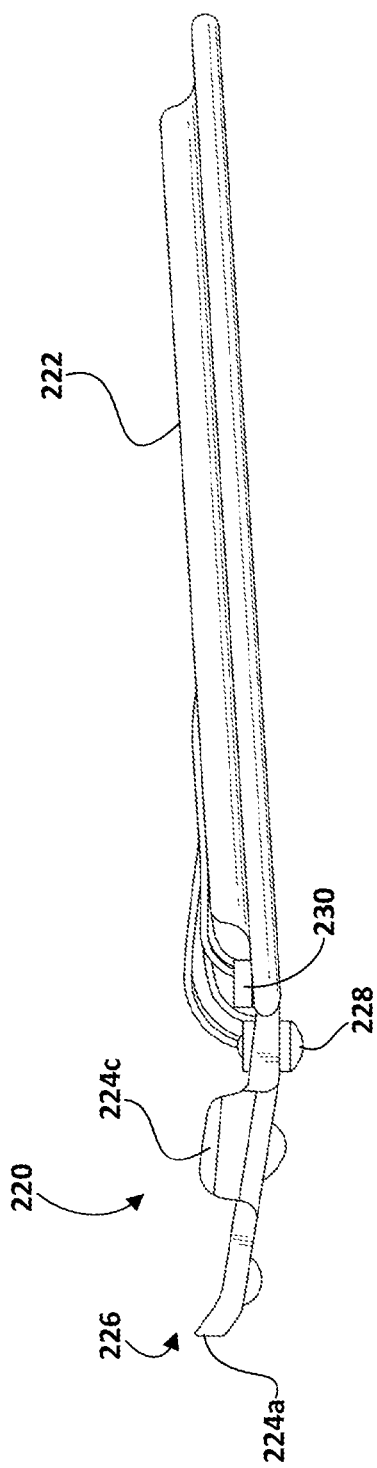
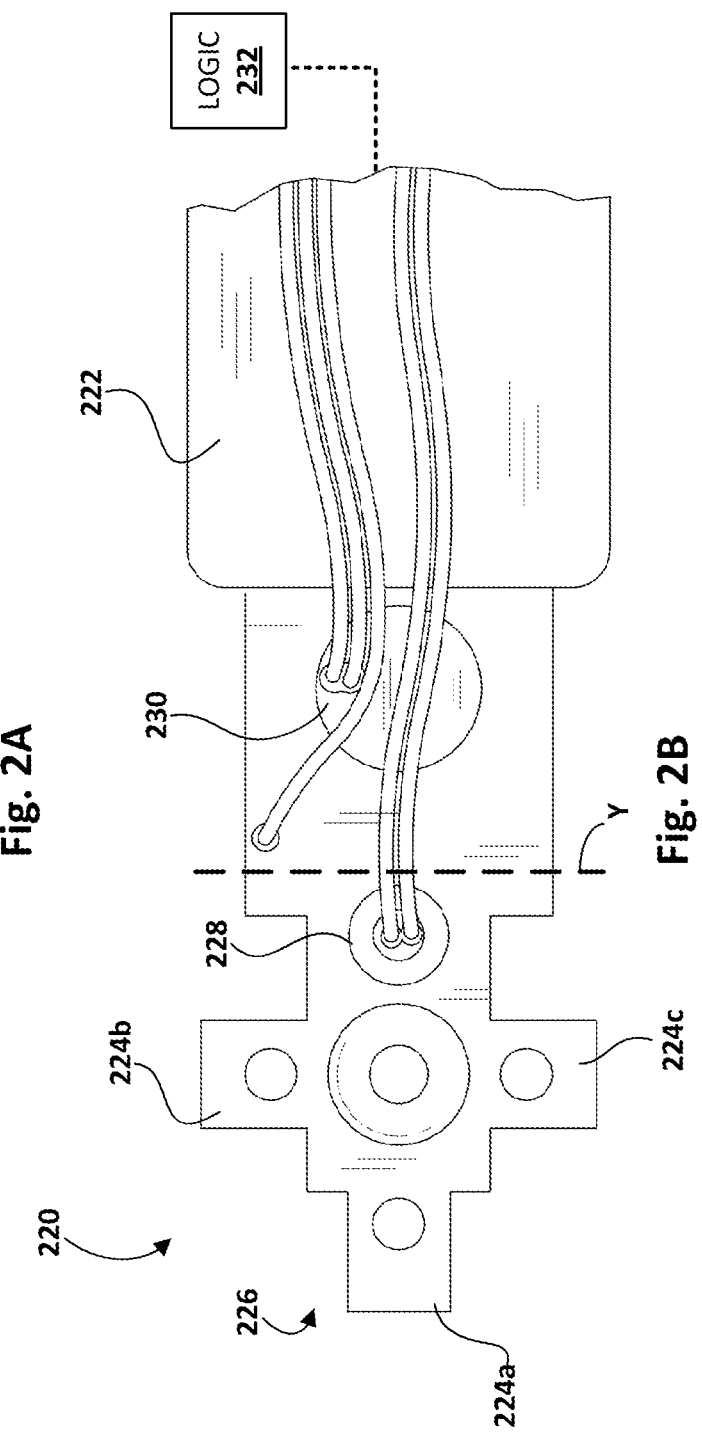

SECURING TOOL

BACKGROUND

Hose clamps may be used to snugly secure hoses to fluid conduits such as nozzles or other hoses. In various situations, such as during an automotive assembly line worker's shift, the worker may be required to install a large number of hose clamps. The potentially tedious and/or monotonous nature of this work may lead to the worker becoming careless and improperly securing a hose to a tubular fluid conduit. Later, when the automobile is filled with fluids, the improperly secured hose may leak.

To attempt to make the worker's job easier and/or more efficient, the worker may be provided with so-called "self-tensioned hose clamps." A self-tensioned hose clamp may be transitioned (e.g., "sprung") from a nominal state, in which the clamp is biased to retract radially inwards but is mechanically prevented from doing so, to a sprung state, in which the clamp has been retracted radially inwards to snugly secure a hose to a tubular conduit. However, it may be difficult to determine whether a self-tensioned hose clamp has been properly secured to a hose because the clamp may retract quite rapidly and liquids may not be introduced until later.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of embodiments of the invention.

FIGS. 2A and 2B depict side and top views, respectively, of an example securing tool configured with selected aspects of the present disclosure.

DETAILED DESCRIPTION

Figure 1A:
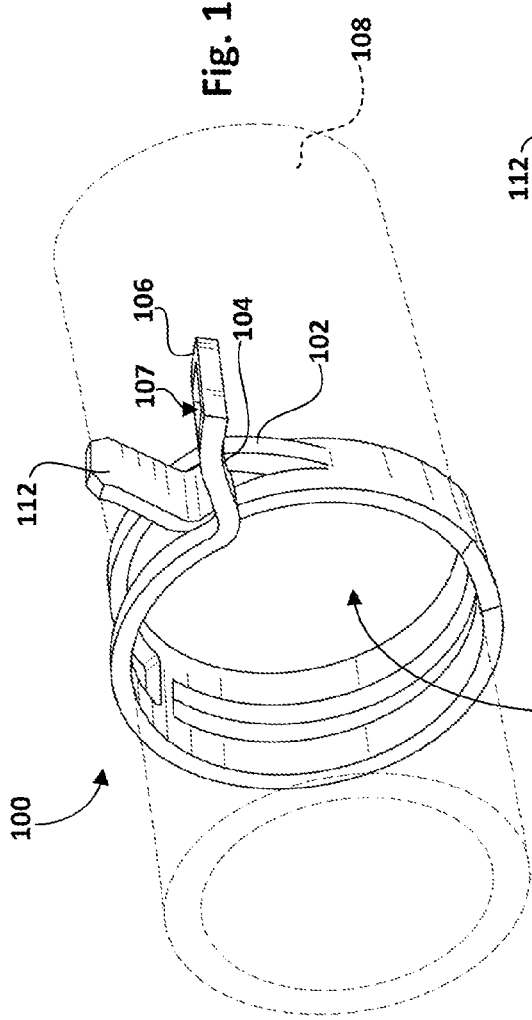
FIGS. 1A and 1B are perspective views of an example self-tensioned hose clamp, in accordance with the prior art.
Figure 1B:
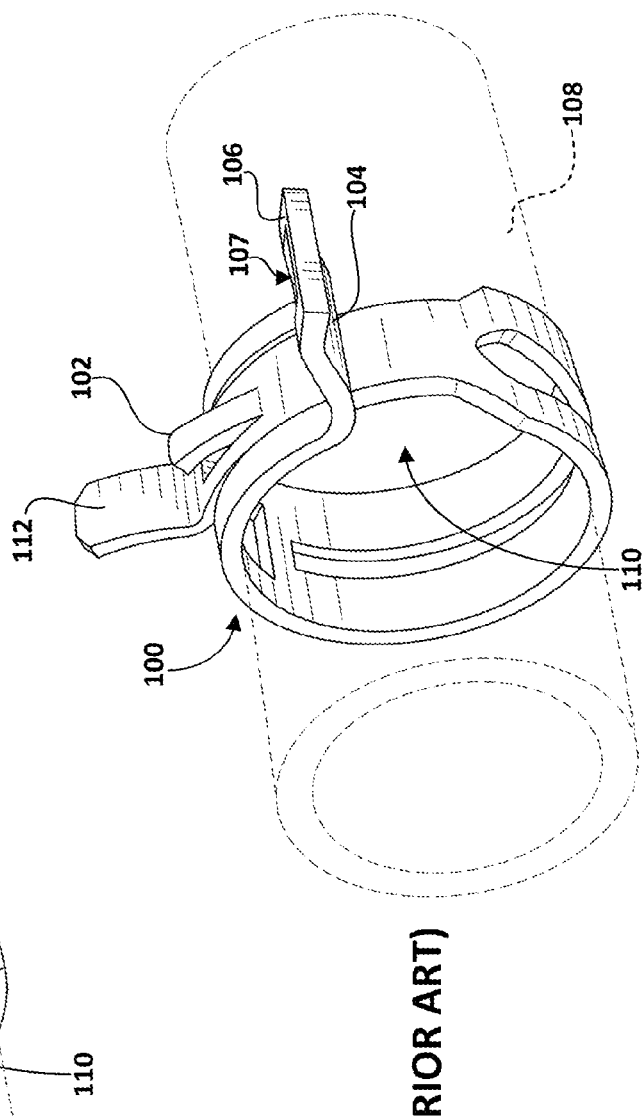

FIGS. 1A and 1B depict perspective views of an example self-tensioned hose clamp 100 from the prior art that may be operated using a securing tool configured with selected aspects of the present disclosure. This is just one example of a self-tensioned hose clamp, and is not meant to be limiting. Other self-tensioned hose clamps from the prior art may come in other configurations and still be operated using tools configured with selected aspects of the present disclosure In FIG. 1A, hose clamp 100 is in a nominal or default state in which it is biased to retract radially inwards but is mechanically prevented from doing so by a catch 102 that abuts a surface 104 of a release 106 of hose clamp 100. Should catch 102 be disengaged from surface 104, e.g., by prying release 106 upwards so that catch 102 may pass underneath release 106, hose clamp 100 may be free to retract inwards, e.g., onto a hose 108 or other tubular conduit that passes through an interior 110 of hose clamp 100. Hose clamp 100 may retract radially inwards until either all of its inherent tension is released, or until it is mechanically prevented from retracting any further by hose 108. Hose clamp 100 is depicted in its sprung state in FIG. 1B.

Figure 3A:
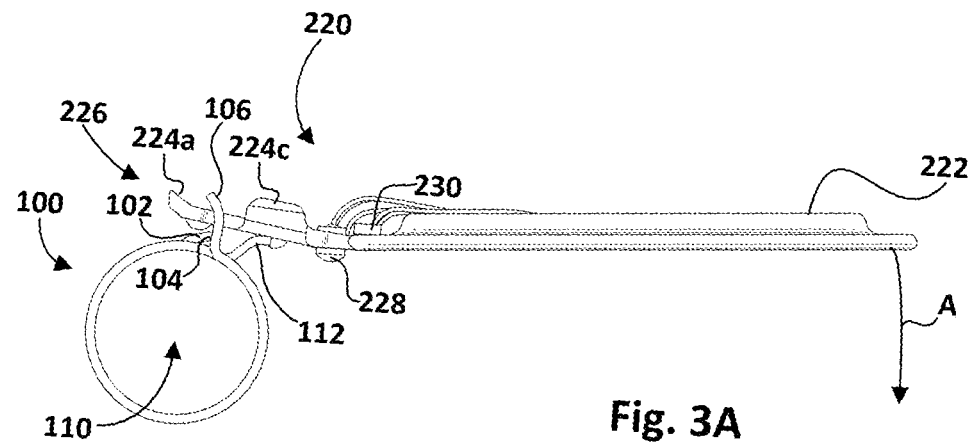
FIGS. 3A-C depict the securing tool of FIGS. 2A-B being operated to spring a self-tensioned hose clamp, in accordance with various embodiments.
Figure 3B:
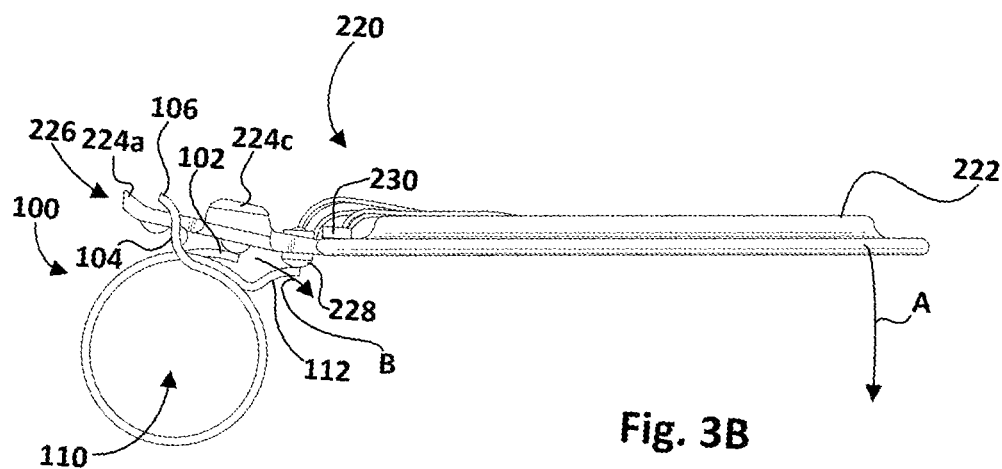
Figure 3C:
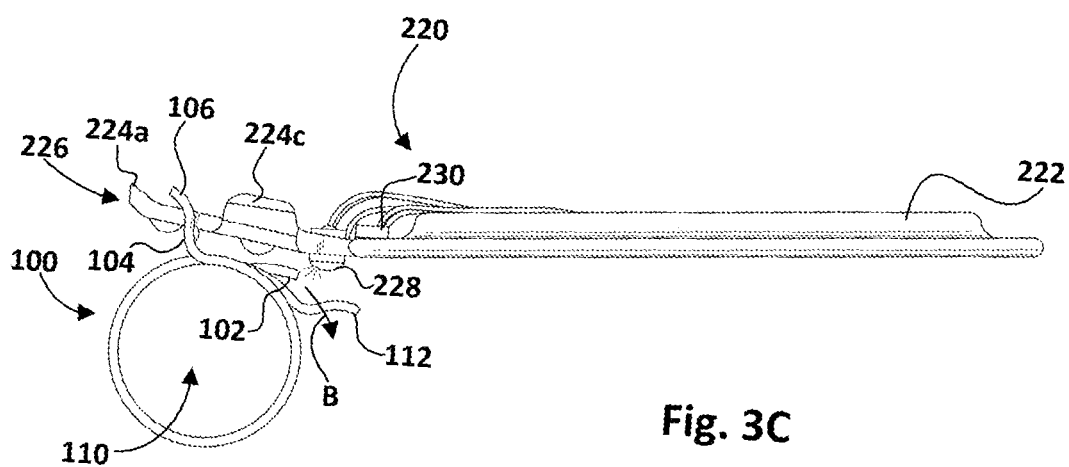

As will be depicted in more detail in FIGS. 3A-C, hose clamp 100 may also include a leverage tab 112 on which a securing tool (see FIGS. 2A-B, 3A-C) may be placed when the securing tool is engaged with a release aperture 107 through release 106. Once the securing tool is so engaged, it may be operated to pry release 106 upwards, disengaging catch 102 from surface 104 and springing hose clamp 100 so that it transitions from the default state depicted in FIG. 1A to the sprung state depicted in FIG. 1B, in which hose clamp 100 has a smaller diameter.

FIGS. 2A and 2B depict top and side views, respectively, of an example securing tool 220 configured with selected aspects of the present disclosure. Securing tool 220 may include an elongate handle 222 that may be shaped to be grasped by, for instance, a human hand. One or more prying members 224 may be positioned at a first end 226 of securing tool 220 opposite handle 222. In the embodiment depicted in FIGS. 2A-B, for instance, there are three prying members 224a-c, which allow a user to approach a hose clamp 100 from a variety of angles. Each prying member 224 may be shaped to engage release aperture 107 through release 106 of self-tensioned hose clamp 100. Once prying member 224 is engaged to release 106, handle 222 may be manipulable to spring self-tensioned hose clamp 100 from the nominal state depicted in FIG. 1A to the sprung state depicted in FIG. 1B.

Securing tool 220 may be equipped with a variety of sensors configured to provide signals indicative of sensed occurrence of various events that occur during operation of securing tool 220 to spring a self-tensioned hose clamp (e.g., 100) to a hose or other tubular conduit. These sensor signals may indicate whether or not the self-tensioned hose clamp was successfully secured to the hose. The sensors may come in various forms.

For example, in FIGS. 2A and 2B, a first sensor 228 and a second sensor 230 are provided. In some embodiments, first sensor 228 may be a so-called "continuity" sensor and second sensor 230 may be a sound sensor, although this is not required. In some embodiments, a continuity sensor may comprise an electrical circuit that is nominally open so that it "senses" the "event" of being closed. An example of how closing such a circuit may be sensed to determine whether a hose clamp is properly secured is depicted in FIGS. 3A-C.

In other embodiments, first sensor 228 may be a strain gauge that includes, for instance, insulating flexible backing that supports a metallic foil pattern. When the insulating flexible back is deformed, the foil is likewise deformed (i.e., the sensed event), altering an electrical resistance of the foil. Additionally or alternatively, a piezoelectric sensor may be employed to sense strain. A sound sensor may be a small microphone, a Lace sensor, a geophone, or another type of device configured to detect an "event" of sound and/or vibration. Wires into sensors 228 and 230 are also visible, but in many embodiments, these wires may be hidden, e.g., within a hollow cavity of handle 222.

FIGS. 3A-C depict one example of how securing tool 220 may be operated to spring self-tensioned hose clamp 100 onto a hose or other tubular conduit (not depicted in FIGS. 3A-C, see FIGS. 1A-B). In FIG. 3A, a front prying member 224a of securing tool 220 has been engaged through a release aperture (not visible in FIGS. 3A-C, 107 in FIGS. 1A-B) through release 106. Another portion of securing tool 220 abuts leverage tab 112. Catch 102 is pressed against surface 104 of release 106, so that release 106 prevents catch 102 from moving towards the right. Otherwise, hose clamp 100 is self-tensioned to be biased to retract radially inwards towards its interior 110. At this point, no portion of hose clamp 100 is in contact with first sensor 228 (which in this embodiment is a continuity sensor). Accordingly, a de facto open electric circuit is provided, with one open end terminating at first sensor 228 and another open end terminating somewhere within first end 226 of securing tool 220 or within hose clamp 100. Closing this circuit as described below creates continuity, which first sensor 228 detects.

In FIG. 3B, handle 222 of securing tool 220 has been moved downward slightly as indicated by the arrow A. This causes front prying member 224a to lift release 106 sufficiently for catch 102 to pass underneath. Consequently, catch 102 and leverage tab 112 move in the direction of arrow B, retracting hose clamp 100 radially inwards towards its interior 110. At the moment depicted in FIG. 3B, leverage tab 112 makes physical contact with first sensor 228. This may close the aforementioned open circuit so that electrical current passes from the wires through first sensor 228 into a conductive portion (not depicted) of hose clamp 100. In some embodiments, hose clamp 100 may be metallic, and thus, the conductive path of hose clamp 100 may include its entire structure. From the conductive portion of hose clamp 100, electrical current may continue back into a conductive path (not depicted in FIGS. 3A-C, see FIG. 2B left of the line labeled Y) through first end 226 of securing tool 220, which may lead back to first sensor 228, forming a closed circuit. While the circuit is closed, the continuity sensor (e.g., 228) may sense the passing current (or voltage), in effect "sensing" when leverage tab 112 contacts first sensor 228.

Second sensor 230 also may detect when leverage tab 112 contacts first sensor 228, e.g., by sensing pressure waves and/or vibrations. For example, due to a relatively large amount of tension being released by hose clamp 100, leverage tab 112 may contact first sensor 228 at a relatively high velocity. This collision may create a distinct and/or sharp sound. Second sensor 230 may be a sound or vibration sensor, and thus may detect the sound of leverage tab 112 contacting first sensor 228.

In FIG. 3C, catch 102 and leverage tab 112 have continued along the trajectory of arrow B. Leverage tab 112 is no longer in contact with first sensor 228, so there is no longer any continuity. Hose clamp 100 may continue to retract radially inwards towards its interior 110 until either all tension that existed when hose clamp 100 was in its default state (see FIG. 1A) is released, or until a hose (not depicted in FIGS. 3A-C, see FIGS. 1A-B) that runs through interior 110 of hose clamp 100 mechanically prevents hose clamp 100 from retracting radially inwards any further.

In various embodiments, signals produced by first sensor 228 and second sensor 230 may be analyzed according to various criteria to determine whether hose clamp 100 was successfully and/or properly secured to a hose or other tubular conduit. For example, in some embodiments, securing tool 220 may include or be operably coupled with logic 232 (see FIG. 2B), such as one or more processors, a field-programmable gate array ("FPGA"), an application-specific integrated circuit ("ASIC"), etc. Logic 232 may be configured to determine whether first and second signals produced by first and second sensors 228 and 230, respectfully, satisfy one or more criteria. Logic 232 may then provide output (e.g., a sound, outbound network communication, illumination of one or more light emitting diodes, haptic feedback, etc.) indicative of the determination. In other embodiments, sensors 228 and 230 may provide their signals to a remote computing device, e.g., using various wired and/or wireless technologies (e.g., RFID, Wi-Fi, BlueTooth, etc.), and the remote computing device may determine whether the first and second signals satisfy a criterion, and may provide output indicative of the determination.

The first and/or second sensor signals produced by first and second sensors 228 and 230, respectively, may be analyzed according to various criteria to determine whether self-tensioned hose clamp 100 was successfully secured to a hose or other tubular conduit. For example, in some embodiments, the criteria includes one or both signals satisfying one or more frequency and/or amplitude thresholds. As another example, the criteria may include detection of the first and second signals by logic 232 within a predetermined time interval.

Figure 4:
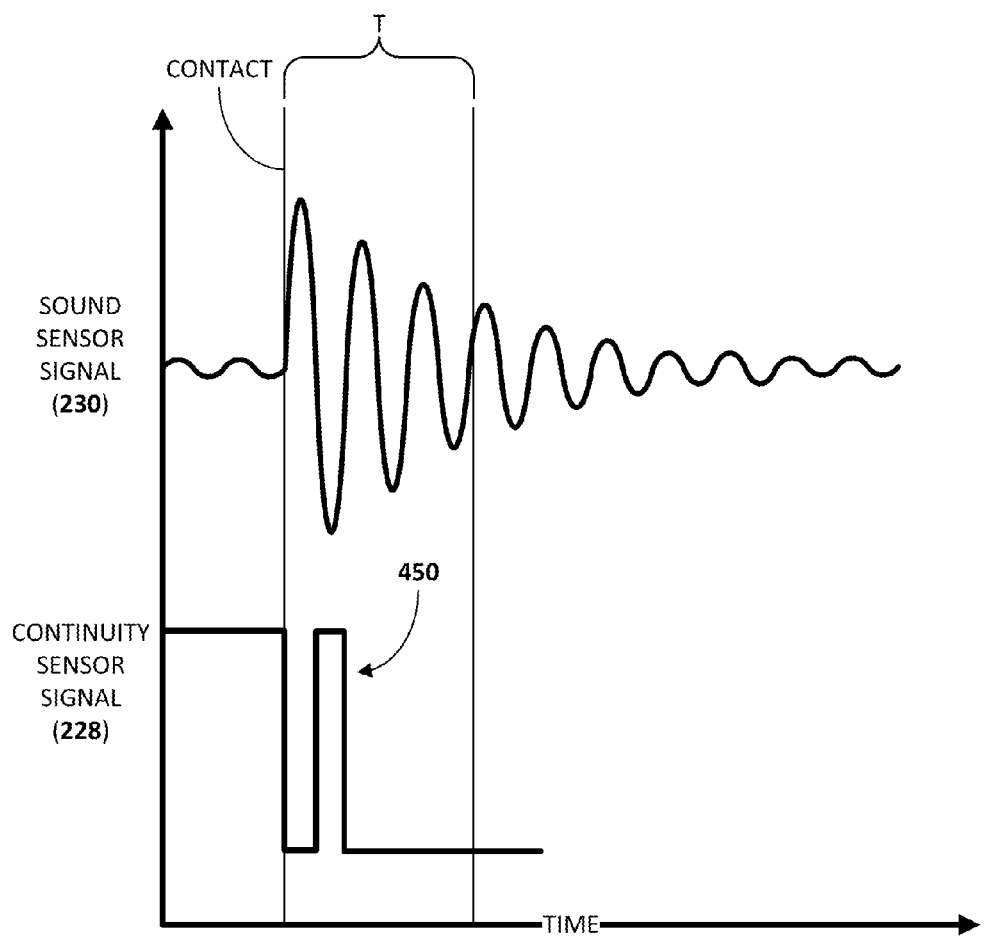
FIG. 4 depicts example waveforms that may be produced by sensors installed on securing tools, in accordance with various embodiments.

An example of a time interval-based criteria is depicted in the chart of FIG. 4, in which the X axis represents time. An example analog signal produced by a sound sensor (e.g., 230) is shown up top and an example digital signal produced by a continuity sensor (e.g., 228) is shown at bottom. For the digital signal produced by the continuity sensor (e.g., 228), up represents no contact between leverage tab 112 and first sensor 228, and down represents contact. These signal types are not meant to be limiting. For example, in other embodiments, the signal produced by the continuity sensor may be an analog signal and/or an analog signal provided by a sound sensor may be converted to digital.

Both signals are relatively or completely flat until a point at which contact is made, e.g., between leverage tab 112 and first sensor 228. At that point in time (labeled "CONTACT" in FIG. 4), the sound sensor signal (produced by second sensor 230) may immediately increase significantly in amplitude and/or frequency, corresponding with the distinct sound produced by leverage tab 112 striking first sensor 228. The amplitude and/or frequency may, in some cases, be highest initially, and then may decrease over time, until the sound signal ultimately returns to its relatively flat shape. At the same time of contact, the continuity sensor signal (e.g., produced by 228) may immediately drop and a timer may be initiated. The extraneous up pulse indicated at 450 may represent leverage tab 112 bouncing off first sensor 228, such that contact (and hence, continuity) is briefly interrupted.

In some embodiments, after passage of the time interval labeled "T" in FIG. 4, the analog sound sensor signal may be analyzed to determine whether one or more criteria are met. For example, various attributes of the analog sound sensor at the end of time interval T, such as its frequency or amplitude, may be compared to one or more thresholds. If one or more of these attributes satisfies one or more thresholds, then hose clamp 100 may be deemed to have been properly installed.

In FIGS. 3A-C, a front prying member 224a of securing tool 220 is used to spring hose clamp 100. But, as depicted in FIG. 2B, in some embodiments, securing tool 220 may include additional, lateral prying members 224b and 224c that extend in a direction that is, for instance, perpendicular to a longitudinal axis of securing tool 220. In various embodiments, sensors 228 and/or 230 may operate the same no matter which prying member 224 is used to engage release 106 of hose clamp 100. For example, and referring back to FIG. 2B, a substantial portion of first end 226 of securing tool 220, such as the entire portion left of the line labeled Y, may be conductive (e.g., metallic). Accordingly, conductive paths may exist between first sensor 228 and any of front prying member 224a, a first side prying member 224b, and/or a second prying member 224c.

Figure 5:
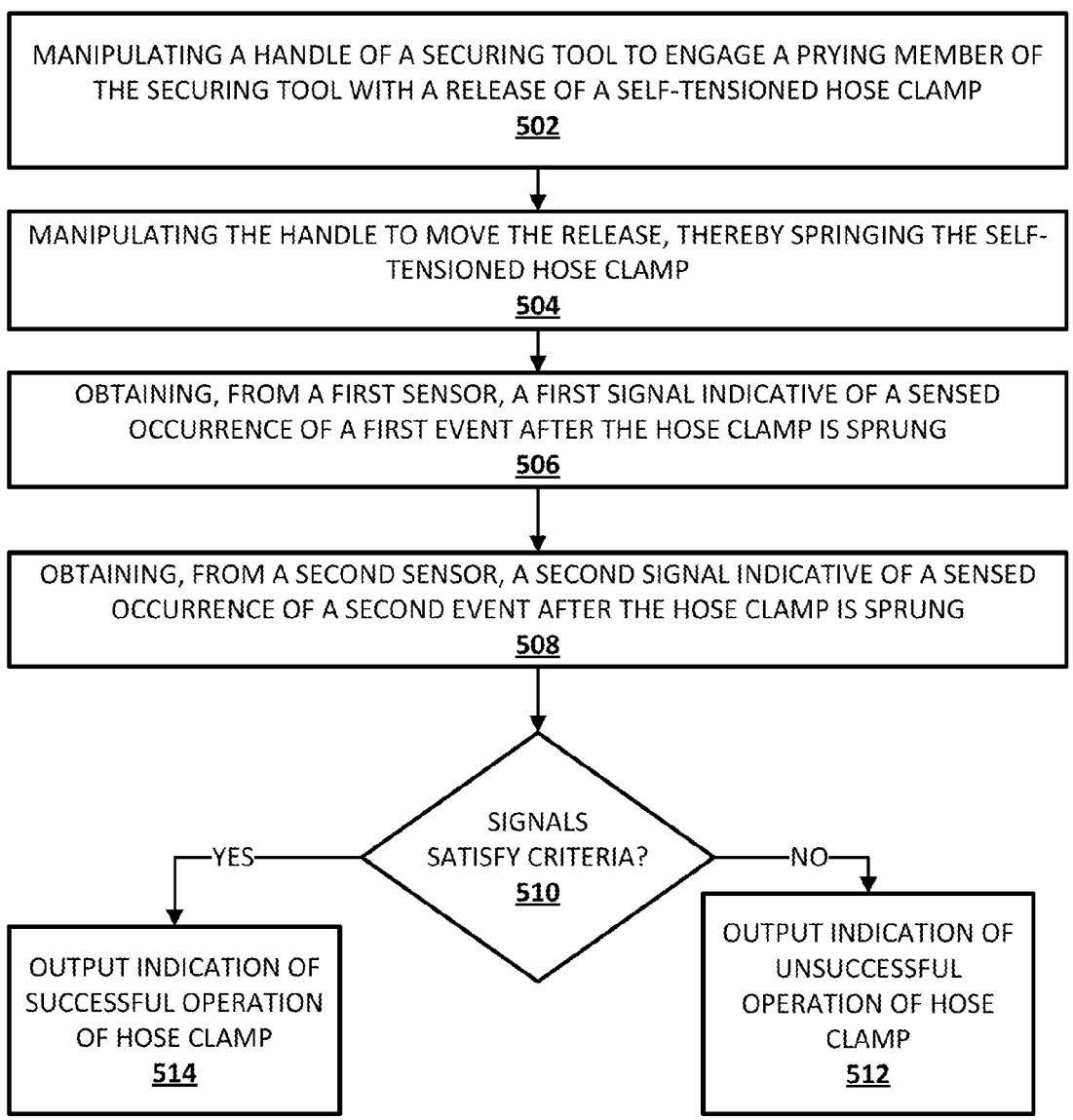
FIG. 5 depicts an example method of operating a securing tool equipped with selected aspects of the present disclosure, in accordance with various embodiments.

FIG. 5 depicts an example method 500 of operating a tool such as securing tool 220 to install a self-tensioned hose clamp such as hose clamp 100 to a tubular conduit such as hose 108, in accordance with various embodiments. While operations are shown in a particular order, this is not meant to be limiting. In various embodiments, various operations may be reordered, added and/or omitted.

At block 502, a handle (e.g., 222) of a securing tool (e.g., 220) may be manipulated to engage a prying member (e.g., 224) of the securing tool with a release (e.g., 106) of a self-tensioned hose clamp (e.g., 100). In various embodiments, the securing tool may also be placed against a leverage tab (e.g., 112) of the hose clamp. At block 504, the handle may be manipulated to leverage the securing tool to lift the release, thereby springing the self-tensioned hose clamp to retract towards its interior (e.g., 110).

At block 506, a first signal may be obtained from first sensor 228. The first signal may be indicative of a sensed occurrence of a first event after the hose clamp is sprung. For example, the first signal may be indicative of continuity detected by a continuity sensor. At block 508, a second signal may be obtained from second sensor 230. The second signal may be indicative of a sensed occurrence of a second event after the hose clamp is sprung. For example, the second signal may be indicative of sound detected by a sound sensor. In other embodiments, the first or second signals may be indicative of strain sensed by a strain sensor.

At block 510, the signals obtained at blocks 506 and 508 may be analyzed to determine whether they satisfy one or more criteria. For example, in some embodiments, if the signals were detected within a predetermined time interval, then the signals may satisfy a criterion. As another example, if one or both signals has a sufficient amplitude and/or frequency, then the signals may satisfy a criterion. As yet another example, if continuity and/or satisfactory sound is sensed within a predetermined time interval of an adequate amount of strain (indicating that securing tool 220 underwent adequate strain to have sprung hose clamp 100), then the signals may satisfy a criterion.

While two signals are analyzed in various examples described herein, this is not meant to be limiting. In some embodiments, more than two sensors may be employed on securing tool, and hence, more than two sensor signals may be analyzed. Additionally, any combination of signals from any type of sensors may be analyzed in various ways to determine whether they satisfy a criterion. For example, sufficient strain being sensed by a strain sensor in combination with satisfactory sound being sensed by a sound sensor may satisfy a criterion. Or, sufficient strain being sensed in combination with continuity may also satisfy a criterion.

Referring back to FIG. 5, if the answer at block 510 is no, then method 500 may proceed to block 512. At block 512, an indication of an unsuccessful operation of the hose clamp with the securing tool may be output. For example, one or more simple output devices integral with securing tool 220, such as a speaker, LED, or other mechanism, may provide audio, visual, and/or haptic feedback indicating that the operation was not successful. Additionally or alternatively, logic (e.g., 232) of the securing tool may provide data indicative of unsuccessful operation to a remote computing device, which may provide more complex output and/or make an entry of the unsuccessful operation in a database. Additionally or alternatively, logic (e.g., 232) of the securing tool may store data indicative of unsuccessful operation in local memory.

Back at block 510, if the answer is yes, then method 500 may proceed to block 514. At block 514, an indication of a successful operation of the hose clamp with the securing tool may be output. For example, one or more simple output devices integral with securing tool 220, such as a speaker, LED, or other mechanism, may provide audio, visual, and/or haptic feedback indicating that the operation was successful. Additionally or alternatively, the securing tool may provide data indicative of successful operation to a remote computing device, which may provide more complex output and/or make an entry of the successful operation in a database. Additionally or alternatively, logic (e.g., 232) of the securing tool may store data indicative of successful operation in local memory.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A securing tool, comprising:
    a handle;
    a prying member positioned at a first end of the securing tool opposite the handle, the prying member shaped to engage a release of a self-tensioned hose clamp to cause the handle to be manipulable to spring the self-tensioned hose clamp;
    a first sensor comprising an open electrical circuit configured to provide a first signal indicative of a sensed occurrence of a physical contact closing the electrical circuit after the handle is manipulated to spring the self-tensioned hose clamp, wherein the physical contact creates a sound;
    a second sensor configured to provide a second signal indicative of detection of the sound created by the physical contact closing the electrical circuit after the handle is manipulated to spring the self-tensioned hose clamp; and
    a logic configured to determine whether the first and second signals satisfy a criterion, and to provide output indicative of the determination, wherein the criterion is detection of the first and second signals by the logic within a predetermined time interval.

2. The securing tool of claim 1, wherein the electrical circuit is closed when a conductive portion of the self-tensioned hose clamp contacts a conductive path of the securing tool.

3. The securing tool of claim 1, wherein the first sensor comprises a strain sensor and the second sensor comprises a sound sensor.

4. The securing tool of claim 1, wherein the output is further indicative of whether the self-tensioned hose clamp was successfully secured to a hose.

5. The securing tool of claim 1, wherein said output indicative of the determination is a sound.

6. The securing tool of claim 1, wherein the output indicative of the determination is an outbound network communication.

7. The securing tool of claim 1, wherein the output indicative of the determination is an illumination of one or more light emitting diodes.

8. The securing tool of claim 1, wherein the output indicative of the determination is a haptic feedback.

9. The securing tool of claim 1, wherein the criterion is the first and second signals satisfying one or more frequency or amplitude thresholds.

10. A method comprising:
    manipulating a handle of a securing tool to engage a prying member with a release of a self-tensioned hose clamp, wherein the prying member is positioned at a first end of the securing tool opposite the handle;
    manipulating the handle to pry the prying member so that the release is moved from a first position in which a surface of the release abuts a catch of the self-tensioned hose clamp to a second position in which the catch is free to move past the surface, thereby springing the self-tensioned hose clamp;
    obtaining, from a first sensor comprising an open electrical circuit, a first signal indicative of a sensed occurrence of a physical contact closing the electrical circuit after the handle is manipulated to spring the self-tensioned hose clamp, wherein the physical contact creates a sound;
    obtaining, from a second sensor, a second signal indicative of a sensed occurrence of detection of the sound created by the physical contact closing the electrical circuit after the handle is manipulated to spring the self-tensioned hose clamp; and
    determining whether the first and second signals satisfy a criterion, wherein the criterion is detection of the first and second signals by a logic within a predetermined time interval.

11. The method of claim 10, further comprising providing output indicative of the determination.

12. The method of claim 10, wherein the first sensor comprises a strain sensor and the second sensor comprises a sound sensor.

13. The method of claim 11, wherein the output indicative of the determination is transmitted to a remote computing device.

14. The method of claim 13, wherein the determining whether the first and second signals satisfy a criterion is performed by logic integral with the securing tool.

15. The method of claim 11, wherein the output indicative of the determination is an illumination of one or more light emitting diodes.

16. The method of claim 15, wherein the output indicative of the determination is a haptic feedback.

17. The method of claim 10, wherein the criterion is the first and second signals satisfying one or more frequency or amplitude thresholds.

\* \* \* \* \*